United States Patent [19]
Jalbert et al.

[11] Patent Number: 5,274,044
[45] Date of Patent: Dec. 28, 1993

[54] GRAFT COPOLYMERS CONTAINING (THIOAROMATIC) ALKYL ACRYLATE RUBBER SUBSTRATES

[75] Inventors: Ronald L. Jalbert, Parkersburg, W. Va.; David V. Howe, Glen Ellyn, Ill.; Robert E. Harris, Washington, W. Va.; Robert R. Gallucci, Mt. Vernon, Ind.

[73] Assignee: General Electric Company

[21] Appl. No.: 920,695

[22] Filed: Jul. 28, 1992

[51] Int. Cl.$^5$ .............................. C08F 273/00
[52] U.S. Cl. ........................... 525/291; 525/281; 525/292; 525/303; 525/309; 525/310; 526/261
[58] Field of Search ............. 525/291, 281, 285, 292, 525/301, 302, 303, 304, 307, 309, 310

[56] References Cited

U.S. PATENT DOCUMENTS

| | | |
|---|---|---|
| 2,570,050 | 10/1951 | Eby . |
| 2,925,406 | 2/1960 | McCurdy et al. . |
| 3,109,021 | 10/1963 | Ek et al. . |
| 3,239,582 | 3/1966 | Keskkula et al. . |
| 3,290,413 | 12/1966 | Fettes . |
| 3,310,540 | 3/1967 | Fang . |
| 3,536,677 | 10/1970 | Hollister . |
| 3,655,824 | 4/1972 | Kato et al. . |
| 3,742,088 | 6/1973 | Holder et al. . |
| 3,880,783 | 4/1975 | Serini et al. . |
| 3,891,719 | 6/1975 | Schirmer et al. . |
| 4,606,864 | 8/1986 | Warren . |
| 4,637,898 | 1/1987 | DeBoer et al. . |
| 4,654,431 | 3/1987 | DeBoer . |
| 4,710,557 | 12/1987 | Warren . |
| 4,733,090 | 3/1988 | DeBoer et al. . |

FOREIGN PATENT DOCUMENTS

| | | |
|---|---|---|
| 382477 | 8/1990 | European Pat. Off. . |
| 1694124 | 7/1971 | Fed. Rep. of Germany . |
| 3321502 | 12/1984 | Fed. Rep. of Germany . |
| 49-44061 | 4/1974 | Japan . |
| 60-26013 | 2/1985 | Japan . |
| 63-268707 | 11/1988 | Japan . |
| 1394481 | 5/1975 | United Kingdom . |

OTHER PUBLICATIONS

Testaferri et al, Journal of Organic Chemistry, 1980, 45, 4376–4380.

*Primary Examiner*—Christopher Henderson
*Attorney, Agent, or Firm*—Lowe, Price, LeBlanc & Becker

[57] ABSTRACT

Compounds of Formula I

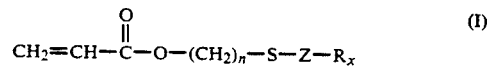

wherein Z is an aromatic group, each R is individually selected from the group consisting of alkyl groups of from 1 to about 12 carbon atoms, thioalkyl groups of from 1 to about 12 carbon atoms, and halogen atoms, n is from 1 to about 6, and x is from 0 to 7, are suitable for use in preparing rubber latex particles. The rubbers are useful as substrates in graft copolymers and the resulting graft copolymers are suitable for use in thermoplastic blend compositions, particularly with transparent polymers. The rubber materials are advantageous in that they exhibit low glass transition temperatures and high refractive indices.

13 Claims, No Drawings

GRAFT COPOLYMERS CONTAINING (THIOAROMATIC) ALKYL ACRYLATE RUBBER SUBSTRATES

FIELD OF THE INVENTION

The present invention relates to novel (thioaromatic) alkyl acrylates, rubbers and graft copolymers formed therefrom, and polymer blend compositions containing the graft copolymers. The (thioaromatic) alkyl acrylates are advantageous in that they may be used to form high refractive index rubbers and graft copolymers which provide transparent thermoplastic polymers having improved impact strength and/or improved environmental stress crack resistance while maintaining the transparency of such polymers.

BACKGROUND OF THE INVENTION

Polycarbonate polymers are well known in the art and are advantageous for use in various applications owing to their rigidity and transparency. Similarly, amorphous polyamide resins are also known in the art and are advantageous for use in various applications owing to their rigidity and transparency. In the past, impact modifiers have been added to both polycarbonates and amorphous polyamides in order to improve their impact strength. For example, many rubber polymers are known for use in impact modifying polymers such as polycarbonate and amorphous polyamide. However, many such rubber polymers have low refractive indices, whereby the transparency of the polymers is disadvantageously reduced. For example, the Serini et al U.S. Pat. No. 3,880,783 discloses polycarbonate compositions which include rubber or graft polymers to improve toughness and weld line strength. A polycarbonate having a low refractive index is employed in an attempt to render the compositions transparent. While polychloroprene rubber has a relatively high refractive index of 1.558, chloroprene is not readily copolymerized, whereby its use in graft copolymers is difficult and its compatibility with other polymers is limited. Additionally, rubber-type polysulfides have high refractive indices in the range of 1.6-1.7. However, these rubbers are extremely thermally unstable and therefore are disadvantageous for use in compositions which are thermally processed.

Additional additives have been employed in combination with polycarbonates and amorphous polyamides in order to improve their environmental stress cracking resistance (ESCR). However, improvements in environmental stress cracking resistance in these types of polymers are similarly accompanied by substantial losses in the transparency of the polymers. Accordingly, there is a continuing need to provide transparent polymer compositions with improved properties such as impact strength and/or environmental stress cracking resistance, without sacrificing the transparency of the polymer compositions.

SUMMARY OF THE INVENTION

It is therefore an object of the present invention to provide means for improving the impact strength and/or the environmental stress cracking resistance of thermoplastic polymers, particularly thermoplastic polymers which are transparent. It is a more specific object of the invention to provide such improved properties to transparent thermoplastic polymers, without substantially sacrificing the transparency of the polymers. It is a related object to provide additives for transparent thermoplastic polymers, which additives improve the impact strength and/or the environmental stress cracking resistance of the polymers without providing any substantial adverse effects on the transparency of the polymers.

These and additional objects are provided by the compounds of the present invention, the rubbers and graft copolymers prepared therefrom, and the thermoplastic blend compositions containing the graft copolymers. More particularly, the compounds according to the present invention comprise (thioaromatic) alkyl acrylates of Formula I:

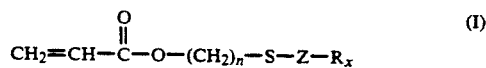

wherein Z is an aromatic group, each R is individually selected from the group consisting of alkyl groups of from 1 to about 12 carbon atoms, thioalkyl groups of from 1 to about 12 carbon atoms, and halogen atoms, n is from 1 to about 6, and x is from 0 to 7. The compounds of Formula I are particularly useful in preparing polymerized rubbers which, together with a grafted portion, form a graft copolymer. The graft copolymers are advantageous in that they exhibit a low glass transition temperature of not greater than about 0° C. and a high refractive index of greater than 1.55. The graft copolymers formed from the compounds of Formula I are therefore suitable for use in thermoplastic blends with transparent polymers such as polyarylates, polycarbonates, polystyrenes, polyphenylene ethers, amorphous polyamides and mixtures thereof, in order to provide the polymers with improved strength and/or environmental stress cracking resistance, without detrimentally effecting the transparency of the polymers.

These and additional objects and advantages will be more fully apparent in view of the following detailed description.

DETAILED DESCRIPTION

The compounds according to the present invention are (thioaromatic) alkyl acrylates of the Formula I:

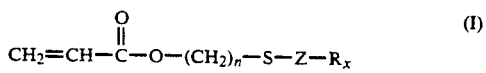

wherein Z is an aromatic group, each R is individually selected from the group consisting of alkyl groups of from 1 to about 12 carbon atoms, thioalkyl groups of from 1 to about 12 carbon atoms, and halogen atoms, n is from 1 to about 6, and x is from 0 to 7. In a preferred embodiment, Z is a phenyl group, wherein x is from 0 to 5, although Z may alternately comprise a naphthyl group, wherein x is from 0 to 7. In a further preferred embodiment, n is at least 2 and more preferably at least 3. It is also preferred that the aromatic group Z includes no substituents (x is 0) or five substituents (x is 5). When x is 5 and the aromatic group is phenyl, the phenyl group is fully substituted and the refractive index of a rubber formed therefrom tends to be higher. A particularly preferred embodiment of the compounds represented by Formula I comprises 3-(thiophenyl)propyl acrylate (3-TPPA).

The compounds of Formula I of the present invention are preferably prepared in a two-step synthesis process.

In the first step, a thioaromatic precursor such as thiophenol or thionaphthol is added to an alkylene alcohol in the presence of a free radical initiator. The resulting intermediate comprises a (thioaromatic) alkanol which is purified and condensed with acryloyl halide, for example, acryloyl chloride, to provide the desired (thioaromatic) alkyl acrylate. Other procedures known in the art, such as condensation of the thioalcohol with acrylic acid or transesterification of a thioalcohol with methyl acrylate, may also be used to synthesize the (thioaromatic) alkyl acrylate. A detailed description of the preparation of a (thioaromatic) alkyl acrylate of Formula I is set forth in Example 1.

The (thioaromatic) alkyl acrylates according to the present invention are particularly useful in preparing polymers and copolymers which are rubbery at room temperature. Thus, the compounds of Formula I are suitable for use in preparing rubbers suitable for use, for example, as substrates in graft copolymers. The rubber preferably comprises an amount of units derived from the monomer of Formula I sufficient to provide the rubber with a low glass transition temperature (Tg), preferably with a Tg of not greater than 0° C., and with a high refractive index, preferably greater than 1.55. In forming the rubber, the monomer of Formula I may be copolymerized with an additional monomer such as butadiene and/or one or more $C_3$–$C_8$ alkyl acrylates, for example, butyl acrylate, or the like. These additional monomers may tend to further lower the Tg of the resulting rubbers. In a preferred embodiment, the rubber comprises at least about 10 weight percent, and more preferably at least about 30 weight percent, of units derived from a monomer of Formula I. Depending on the desired use of the rubber, it may be preferable to include up to about 70 weight percent of units derived from monomer of Formula I, while in other embodiments, it may be preferable to include greater than 70 weight percent, and even up to 100 weight percent, of units derived from monomer of Formula I. Thus, in one embodiment, the rubber may be formed entirely from a monomer of Formula I.

The rubber polymers and copolymers formed from the (thioaromatic) alkyl acrylate compounds of the present invention, suitable for use as a rubber substrate in the graft copolymers of the invention, are suitably formed by any of the well known polymerization techniques. That is, the rubbers may be formed by emulsion, bulk, mass, suspension or solution polymerization techniques, or combinations thereof, in accordance with methods known in the art. In one embodiment, the rubber may be formed by emulsion polymerization via a redox initiation reaction using a crosslinking monomer such as a divinyl or trivinyl monomer. Alternately, or additionally, the polymerization reaction may be conducted in the presence of an allyl monomer, for example, a diallyl or triallyl monomer, to increase the number of grafting sites in the resulting rubber. Suitable crosslinking and graft site-providing monomers include, but are not limited to, divinyl benzene, butylene glycol di(meth)acrylate, trimethylolpropane tri(meth)acrylate, triallyl cyanurate, allyl(meth)acrylate, and mixtures thereof. The crosslinking and graft site-providing monomers may be employed in a total amount of up to about 3% by weight of the monomers from which the rubber is formed. The average particle size of the resulting rubber latex can be varied in accordance with well known techniques. It is preferred that the average particle size of the rubber is in a range of from about 0.05 to about 10 microns. For example, when the rubbers are prepared by emulsion polymerization techniques, the rubber average particle size may range from about 0.05 to about 0.5 microns. Using bulk polymerization techniques, the average particle size may range from about 0.7 to about 10 or more microns. Examples of the preparation of rubber polymers from a (thioaromatic) alkyl acrylate of the present invention are set forth in Examples 2 and 3.

The rubbers prepared from the (thioaromatic) alkyl acrylate compounds of the present invention are particularly suitable for use as substrates in graft copolymers wherein they are grafted with one or more ethylenically unsaturated monomers As used in the present specification, the terms "graft copolymer" and "graft polymer" refer not only to the products which result from the chemical bonding of the grafting monomer or monomers on the preformed rubber substrate, but also to mixtures of such products with polymers resulting from the polymerization of only the grafting monomers and not including the preformed rubber substrate. In a preferred embodiment of the graft copolymer of the present invention, a majority of the monomers from which the grafted portion is formed comprises styrene, halogen-substituted styrenes, alkyl-substituted styrenes, such as alpha-methylstyrene, para-methylstyrene, and the like, or mixtures thereof. Particularly preferred monomers comprise styrene, dibromostyrene, alpha-methylstyrene, and mixtures thereof. These monomers are preferred for use in preparing the grafted portion in order that the grafted portion will exhibit a high refractive index, preferably greater than 1.55, similar to the rubber substrate, whereby the resulting graft copolymer will exhibit such a high refractive index. It is particularly preferred that the difference in the refractive indices of the rubber substrate and the grafted portion is not greater than 0.025 in order to maintain and maximize the transparency of the graft copolymer.

In a further embodiment, wherein the grafted portion is formed from at least one monomer selected from styrene, halogen-substituted styrenes, alkyl-substituted styrenes, and mixtures thereof, the grafted portion may also be formed from a small amount, for example, from 0.1 to about 15 weight percent, of an additional monomer selected from the group consisting of maleic acid, itaconic acid, fumaric acid, acrylic acid, methacrylic acid, derivatives of these acids, acrylonitrile, methacrylonitrile, mixtures thereof and the like. Suitable derivatives of the aforementioned acids include maleic anhydride and $C_1$–$C_{10}$ esters of acrylic and methacrylic acids. Additionally, a crosslinking monomer or a graft site-providing monomer may be used in the formation of the grafted portion in order to minimize the formation of any free rigid resin and increase the extent of grafting. Suitable crosslinking and graft site-providing monomers include those described above for use in forming the rubber substrate. The crosslinking and graft site-providing monomers may be used in a total amount of up to about 3% by weight of the monomers from which the grafted portion is formed.

The graft copolymers may be formed by any method known in the art for the formation of graft copolymers. The graft copolymers preferably contain from about 5 to about 90 weight percent of the rubber substrate and from about 10 to about 95 weight percent of the grafted portion. More preferably, the graft copolymers contain from about 50 to about 90 weight percent of the rubber substrate.

The graft copolymer containing the rubber substrate formed from a (thioaromatic) alkyl acrylate compound of Formula I is advantageous in that the rubber substrate exhibits a low glass transition temperature Tg and a high refractive index. Preferably, the (thioaromatic)alkyl acrylate of Formula I is included in the rubber substrate of the graft copolymer in an amount sufficient to provide the graft copolymer with a glass transition temperature of not greater than 0° C. and a refractive index greater than 1.55. Thus, the graft copolymers of the present invention are particularly suitable for use in blend compositions with one or more additional thermoplastic polymers, particularly thermoplastic polymers which are transparent. Generally, polymers having a refractive index of greater than 1.55 exhibit significant transparency. Transparent polymers having a refractive index greater than 1.55 are set forth by Seferis, *Polymer Handbook, Third Edition*, John Wiley & Sons, pp. VI/451-461, incorporated herein by reference. For example, transparent polycarbonate based on bisphenol-A has a refractive index of 1.58 or greater. Amorphous polyamide, formed for example from a mixture of phthalic acids and hexamethylene diamine, also has a refractive index greater than 1.55. Thus, the graft copolymers of the present invention are particularly suitable for use in improving the impact strength and/or the environmental stress cracking resistance of such polymers while maintaining their transparency. In a preferred embodiment of the blend compositions of the present invention, the difference in the refractive indices of the graft copolymer and the thermoplastic polymer with which it is blended is not greater than about 0.025, and more preferably is not greater than about 0.005. Other polymers are also suitable for use in the blend compositions of the present invention, with transparent polymers being particularly preferred so that the graft copolymers of the present invention may be further advantageously employed to maintain the transparency of the thermoplastic polymers.

The polycarbonate which may be included in the blend compositions may be any aliphatic or aromatic homopolycarbonate or co-polycarbonate known in the art. The polycarbonate component may be prepared in accordance with any of the processes generally known in the art, for example, by the interfacial polycondensation process, by polycondensation in a homogeneous phase or by transesterification. These processes and the associated reactants, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; 3,258,414; and 4,749,754, all of which are incorporated herein by reference. Suitable aromatic polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)sulphides, bis-(hydroxyphenyl) -ethers, bis-(hydroxyphenyl)-ketones, bis-(hydroxyphenyl)-sulphoxides, bis-(hydroxyphenyl)-sulphones, $\alpha,\alpha$-bis-(hydroxyphenyl)-diisopropyl benzenes, and their nucleus-alkylated and nucleus-halogenated derivatives, and mixtures thereof. A particularly preferred bisphenol is 2,2-bis-(4 -hydroxyphenyl)-propane, more commonly known as bisphenol A.

Copolycarbonates particularly suitable for use in the present invention include poly(ester carbonate) resins which may generally be described as polymers containing recurring carbonate groups, carboxylate groups and aromatic carboxylic groups in the linear polymer chain, in which at least some of the carboxylate groups and at least some of the carbonate groups are bonded directed to ring carbon atoms of the aromatic carboxylic groups. These poly(ester carbonate) polymers are generally prepared by reacting an aromatic difunctional carboxylic acid or ester forming derivative, a dihydric phenol and a carbonate precursor, as disclosed in U.S. Pat. Nos. 3,030,331; 3,169,121; 3,207,814; 4,194,038 and 4,156,069, incorporated herein by reference.

Amorphous polyamides are also particularly suitable for use in the thermoplastic blend compositions of the present invention. Included within the term "amorphous polyamides" as used herein are polyamide polymers that are transparent or have a heat of fusion of about 1 calorie per gram or less, as determined by differential scanning calorimetry (DSC). Such amorphous polyamide polymers may have a degree of crystallinity as high as 5%, and for some polyamides, the degree of crystallinity may be even higher. Preferably, the amorphous polyamides will not have a crystallization transition or crystalline melting transition temperature and therefore, no measurable degree of crystallinity. Amorphous polyamides, and their methods of preparation, are disclosed in detail in U.S. Pat. No. 4,749,754 incorporated herein by reference.

Particular examples of amorphous polyamides for use in the invention include, but are not limited to:

PACP-9/6, which is a 50:50 mole ratio copolymer of 2,2'-bis(4-aminocyclohexyl) propane and a 60/40 weight percent mixture of azelaic acid and adipic acid. A more detailed description of the preparation of this polymer is found in U.S. Pat. No. 3,840,501, which is incorporated herein by reference;

Zytel ® 330 and Sela ® PA, which are amorphous polyamides derived from hexamethylene diamine and mixtures of terephthalic acid and isophthalic acid. These amorphous polyamides are available from E. I. DuPont;

Grilamid ® TR 55, which is an amorphous polyamide derived from isophthalic acid/bis(4-amino-3-methylcyclohexyl) methane/lauryl lactam and is available from Emser Industries; and Trogamid ® T, which is derived from dimethyl terephthalate and a mixture of 2,2,4- and 2,4,4-trimethylhexamethylene diamine and is available from Dynamit Nobel.

In a preferred embodiment, the amorphous polyamide is formed from hexamethylenediamine and isophthalic acid and/or terephthalic acid. This amorphous polyamide is commonly referred to as PA 6, I/T. In another preferred embodiment, the blend compositions of the present invention contain a mixture of a polycarbonate and an amorphous polyamide, wherein the refractive indices of the polycarbonate and polyamide do not differ by more than about 0.025, and preferably not more than about 0.005.

Additional transparent polymers having a refractive index greater than or equal to 1.55, and particularly suitable for use in the blend compositions of the present invention, include, but are not limited to, polystyrene, poly(styrene-co-maleic anhydride), poly(styrene-co-acrylonitrile) (75:25 weight ratio), polyphenylene ethers, for example, poly(oxy-2,6dimethylphenylene), poly(oxyethyleneoxyterephthaloyl) (amorphous) (poly-(ethylene terephthalate)), poly (p-methoxy styrene), poly(o-chlorostyrene), poly(2,6-dichlorostyrene), and poly(sulfone). Also suitable are polyarylates based on the condensation of bisphenol-A with mixtures of isophthalic acid and terephthalic acid, or esters thereof.

Preferably, the graft copolymers are included in the blend compositions of the present invention in an amount sufficient to improve the impact strength and/or the environmental stress cracking resistance of the thermoplastic polymer, particularly under solvent environments as is demonstrated in the examples. In a preferred embodiment, the compositions comprise from about 50 to about 99 weight percent of at least one additional thermoplastic polymer and from about 1 to about 50 weight percent of the graft copolymer.

As noted above, the thermoplastic blend compositions of the present invention may include two or more thermoplastic polymers if so desired. Additionally, conventional additives may be included in the composition. Such additives include, but are not limited to, stabilizers, antioxidants, flame and fire retardants, reinforcing agents, and the like. The blend compositions may be prepared according to conventional techniques, including melt blending or mixing, and the like.

The compounds, rubbers, graft copolymers and blend compositions of the present invention are demonstrated in the following examples. In the examples, and throughout the present specification, references to parts and percentages are by weight, unless otherwise specified.

EXAMPLE 1

This example demonstrates the preparation of a (thioaromatic) alkyl acrylate of Formula I, namely, 3-(thiophenyl)propyl acrylate. A two-step synthesis process was conducted using a glass-lined reactor system. Toluene (10 L) was added to the reactor and heated to about 72° C. Azobisisobutyronitrile (AIBN) (15g) was added to the reactor and the addition of thiophenol and allyl alcohol was commenced. The addition of the allyl alcohol was maintained slightly ahead of the thiophenol addition on a stoichiometric basis in order to minimize disulfide formation. The addition of the allyl alcohol and thiophenol was continued for a total of 12 hours while adding AIBN in 15 g increments. A total of 5.50 Kg thiophenol, 3.65 Kg allyl alcohol and 0.165 Kg AIBN were added. After completion of the reactive additions, the mixture was heated for an additional 24 hours. The reactive contents were then cooled and the 3-(thiophenyl) propanol product was separated and purified In the second step of the synthesis procedure, 3-(thiophenyl) propanol (2.793 Kg), toluene, triethylamine (17.93 Kg) and hydroquinone (0.5 g) were combined in a reactor which was maintained with an air atmosphere to prevent polymerization of acrylate. The reactor contents were cooled to 0° C and acryloyl chloride (1.610 Kg) was added. The reactor temperature was then raised to 17° C. and maintained for 4 hours. A liquid chromatography sample indicated 99% conversion to 3-(thiophenyl)propyl acrylate. The reactor contents were cooled and the acrylate product was separated. In order to remove residual toluene, the product was concentrated at 90° C. and 0.5 mm Hg in a flask equipped with a short path Claison distillation head to provide 1.5 Kg of 3-(thiophenyl)propyl acrylate as a dark yellow oil. The overall yield was 41% based on 3-(thiophenyl) propanol.

EXAMPLE 2

This example demonstrates the preparation of a rubber latex from 3-(thiophenyl)propyl acrylate. A mixture of demineralized water (50 g), a surfactant comprising Triton X-200 (4.8 g), 3-(thiophenyl)propyl acrylate (40 g) and ammonium persulfate (0.08 g) was prepared. A portion of this mixture (19.0 g) was mixed with 50 g of demineralized water and heated to 90° C. with stirring. The remaining monomer-surfactant-catalyst-water mixture was added over a period of 30 minutes while maintaining the reaction temperature in a range of 90°-95° C. Sulframin 1240, an alkyl aryl sulfonate, (1.0 g), demineralized water (21.0 g) and benzoyl peroxide (0.16 g) were then added and the reaction was maintained at 90°-95° C. for 7 additional hours with no significant increase in conversion. The resulting product had a refractive index of 1.5895 at room temperature.

EXAMPLE 3

This example demonstrates an alternate process for the preparation of the rubber latex from 3-(thiophenyl)-propyl acrylate. A mixture of demineralized water (185 g), Sulframin 1240 (0.78 g active), and tetrasodium pyrophosphate (1.0 g) were heated with stirring under an inert atmosphere at 75° C. Two solutions were added to this mixture separately over a one-hour period. The first solution comprised sodium formaldehyde sulfoxylate dihydrate (0.15 g), the disodium salt of ethylenediaminetetraacetic acid (0.045 g), ferrous sulfate heptahydrate (0.015 g) and demineralized water (20 g). The second solution comprised 3-(thiophenyl)propyl acrylate (100 g) and cumene hydroperoxide (0.205 g). Approximately 18 minutes after the addition of the two solutions began, an additional portion of Sulframin 1240 (2 g in 20 ml of demineralized water) was added to the reaction. After both solutions were added, the temperature of the reaction was increased to 95° C. After approximately 45 minutes, Vazo ®-64 (azobisisobutyronitrile) (0.16 g slurried in 32 g of demineralized water), a vinyl polymerization catalyst supplied by DuPont, was added and the mixture was heated for an additional 20 minutes. The resulting latex contained 22.91% solids, and 41.7 g of coagulum was formed. A portion of the latex was coagulated with 3.5 phr calcium chloride at 1° C., and a sticky mass separated. The mass was purified by three reprecipitations from methylene chloride into methanol. The last reprecipitation was conducted at −78° C. The resulting poly[3-(thiophenyl)propyl acrylate] comprised a rubbery material having a Tg of −14° C. and a refractive index of 1.5905. The material exhibited less than a 5% weight loss when heated to 335° C. during TGA analysis.

EXAMPLE 4

In this example, a lightly crosslinked rubber material was prepared using the same general procedure described in Example 3 except that triallyl cyanurate (0.25% based on the propyl acrylate monomer) was mixed with the monomer and the cumene hydroperoxide. The polymerization proceeded in a manner similar to that described in Example 3.

EXAMPLE 5

In this example, a graft copolymer comprising a 3-(thiophenyl)propyl acrylate rubber substrate was prepared. Specifically, a portion of the latex prepared in Example 3 (35.05 g solids) was heated to 77° C. Styrene (40 g) and Lupersol® 11 (0.3 g active), an organic peroxide solution supplied by Pennwalt Corporation, were added and the temperature was increased to 90° C. After one hour, conversion was essentially complete and the resulting copolymer comprising styrene grafted to the 3-thiophenyl)propyl acrylate rubber substrate was isolated by coagulation with 3.5 phr calcium chloride at room temperature. The refractive index of the resulting material was 1.591.

EXAMPLE 6

In this example, a graft copolymer was prepared using the same general procedure as that described in Example 5 except that the latex employed herein was the lightly crosslinked latex resulting from Example 4. Additionally, in this example, the reaction temperature was maintained at 95° C. The formation of the graft copolymer proceeded in a manner similar to that described in Example 5.

EXAMPLE 7

This example demonstrates a thermoplastic blend composition according to the present invention. The blend composition which was prepared comprised a polycarbonate and a graft copolymer formed from a 3-(thiophenyl)propyl acrylate rubber substrate. Specifically, the polycarbonate was formed from bisphenol-A and had a refractive index of 1.587. The graft copolymer was formed by polymerizing 3-(thiophenyl)propyl acrylate monomer in emulsion via a redox initiation with triallyl cyanurate in accordance with the general procedures of Example 4. The resulting rubber latex polymer exhibited a Tg of −14° C. and a refractive index of 1.59. Styrene was then grafted to the rubber latex substrate using the general procedure of Example 5 and employing a rubber to styrene ratio of 60:40. To form the blend composition, 95 parts by weight of the polycarbonate and 5 parts by weight of the graft copolymer were melt blended using a Banbury/mill. The resulting product was diced into granules, and the granules were injection and compression molded into test specimens. For comparison purposes, test specimens were also prepared by a similar process from polycarbonate alone, containing no graft copolymer, from a composition comprising 95 weight percent polycarbonate and 5 weight percent of a polystyrene polymer and from a composition comprising 95 weight percent of the polycarbonate and 5 weight percent of a conventional methylmethacrylate-butadiene-styrene (MBS) impact modifier having a refractive index of 1.535.

The samples were subjected to measurement of transparency according to ASTM D -1003 and -1925 using 70 mil compression molded plaques. Samples were also subjected to measurement of notched Izod impact strength according to ASTM D 256 at 73° F., both after injection molding and after three sterilization cycles in an autoclave at 250° F. Finally, the samples were subjected to measurement of their environmental stress cracking resistance using a Ruhnke jig using various solvents, temperatures and exposure times. The results of these measurements for each of the compositions described above are set forth in Table I. With reference to Table I, Compositions A-C represent the control compositions while Composition D represents a blend composition according to the present invention.

TABLE I

| | A | B | C | D |
|---|---|---|---|---|
| Composition (pbw) | | | | |
| (pbw) | | | | |
| Polycarbonate | 100 | 95 | 95 | 95 |
| Polystyrene | — | 5 | — | — |
| MBS | — | — | 5 | — |
| Graft Copolymer of Styrene grafted to 3-TPPA substrate | — | — | — | 5 |
| Transparency | | | | |
| % Transmission | 82.6 | 76.3 | 59.0 | 79.3 |
| % Haze | 14.6 | 23.1 | 39.1 | 23.9 |
| Yellowness Index | 10.2 | 18.5 | 42.5 | 12.6 |
| Visual Comparison | Clear | Clear | Opaque | Clear |
| Izod Impact Strength (ft.-lbs./inch of Notch) | | | | |
| Injection Molded | | | | |
| ⅛" Test Bar | 17.8 | 16.2 | 16.1 | 18.2 |
| ¼" Test Bar | 2.1 | 1.3 | 13.7 | 4.5 |
| After 3 sterilization cycles | | | | |
| ⅛" Test Bar | 2.0 | 1.9 | 16.3 | 5.7 |
| ¼" Test Bar | 1.4 | 1.3 | 10.2 | 3.7 |
| Environmental Stress Cracking Resistance | | | | |
| 2% strain, 5% KOH, 180° F., Time to Fracture (hr.) | 1 | 1 | 26–28 | 26–28 |
| 1% strain, 5 KOH, 180° F., 15 minute exposure Flex. Energy (psi-inch) | 12,220 | Failed in jig | 11,880 | 12,340 |
| 2% strain, heptane, 1½ hours, room temperature Flex. Energy (psi-inch) | 5,380 | 1,760 | 11,420 | 11,920 |
| 1% strain, m-Cresol, 15 minutes, room temperature Flex. Energy (psi-inch) | 5,140 | 6,940 | 9,360 | 8,840 |
| 1% strain, 10% KOH, room temperature, 7 days Flex. Energy (psi-inch) | 12,340 | 12,920 | 12,040 | 12,960 |
| 1% strain, chloroform, room temperature, 15 minute Flex. Energy (psi-inch) | 9,640 | 10,820 | 10,640 | 11,080 |

As indicated by the transparency data in Table I, Composition A containing only polycarbonate exhibits good transmission and little haze or yellowness. On the contrary, Composition C which comprises polycarbonate and a conventional impact modifier exhibits significantly reduced transmission and significantly increased haze and yellowness, and the composition is opaque. Composition D according to the present invention containing the graft copolymer of styrene and the 3-(thiophenyl)propyl acrylate rubber substrate retained the good transparent properties of the polycarbonate. The Izod impact strength data set forth in Table I demonstrates that Composition D according to the invention provided improved impact strength properties as compared with Composition A containing only polycarbonate and as compared with Composition B containing polycarbonate and polystyrene. Finally, the environmental stress cracking resistance data set forth in Table I demonstrates that Composition D according to the present invention exhibited significantly improved environmental stress cracking resistance as compared with Composition A containing only polycarbonate, under various solvent conditions. Thus, Composition D according to the present invention is advantageous in maintaining the transparency of polycarbonate while increasing the impact strength and the environmental stress cracking resistance.

EXAMPLE 8

This example demonstrates a further blend composition according to the present invention comprising an amorphous polyamide and a graft copolymer. The graft copolymer comprised a 3-(thiophenyl)propyl acrylate rubber substrate having a 3% itaconic acid-modified polystyrene grafted thereto. The rubber substrate was prepared as follows: a solution of Sulframin 1240 (0.231 parts, 39% active) and demineralized water (185 parts) was heated to 60° C. Twenty percent of a solution comprising 3-(thiophenyl)propyl acrylate (98.5 parts), triallyl cyanurate (1.5 parts) and cumene hydroperoxide (0.323 parts) was added and the resulting solution was agitated for five minutes. Twenty percent of a solution comprising demineralized water (15 parts), sodium formaldehyde sulfoxylate (0.462 parts), the disodium salt of ethylenediaminetetraacetic acid (0.0615 parts) and ferrous sulfate (0.0308 parts) was then added. Once an exotherm was detected, the remaining portions of the 3-(thiophenyl)propyl acrylate solution and the sodium formaldehyde sulfoxylate solution were added and a solution comprising Sulframin 1240 (1.308 parts), tetrasodium pyrophosphate (0.077 parts) and demineralized water (31 parts), was also added. The temperature of the reaction mixture was increased to 71° C. and the reaction was continued for an additional hour. The resulting rubber latex contained particles ranging in size from 0.09 to about 0.14 microns and having a refractive index of approximately 1.585. The graft copolymer was prepared using this rubber latex (65 parts), styrene (33.6 parts), divinyl benzene (0.35 parts), itaconic acid (1.05 parts) and cumene hydroperoxide (0.375 parts). The graft copolymer was coagulated with calcium chloride at 180° F.

The blend composition of the invention was prepared from 85 parts by weight of an amorphous polyamide which comprised the condensation product of a mixture of isophthalic acid and terephthalic acid (65:35 weight ratio of acids) with hexamethylene diamine, and 15 parts by weight of the graft copolymer. The blend composition was prepared by melt blending and the resulting granules were injection molded and compression molded into test samples. For comparison purposes, test samples were also provided from a composition comprising 100 weight percent of the amorphous polyamide, without the graft copolymer. The test samples of the compositions were subjected to measurement of transparency, Izod impact and environmental stress cracking resistance in accordance with the general procedures described in Example 6. Samples were also subjected to measurement of the heat deflection temperature according to ASTM D 648 and the tensile properties according to ASTM D 638. The results of these measurements are set forth in Table II.

TABLE II

| | E | F |
|---|---|---|
| Composition (pbw) | | |
| Polyamide | 100 | 85 |
| Graft Copolymer of styrene/itaconic acid grafted to 3-TPPA | — | 15 |
| Transparency | | |
| % Transmission | 81.2 | 64.3 |
| % Haze | 31.3 | 28.6 |
| Yellowness Index | 19.6 | 30.2 |
| Izod Impact Strength (⅛", ft-lb/in) | 0.5 | 1.5 |
| Heat Deflection Temperature (¼", °F.) | | |
| Unannealed | 198 | 187 |
| Annealed | 234 | 234 |
| Tensile strength (× 10⁴ psi) | 10.60 | 7.60 |
| Modulus (× 10⁵ psi) | 4.37 | 3.52 |
| Percent Elongation | 22.6 | 34.7 |
| Environmental Stress Cracking Resistance (7 days) | | |
| *% Flexural Energy Retention* | | |
| 0% Strain | | |
| MEK | 101.6 | 95.6 |
| Isopropanol | 94.8 | 85.4 |
| 0.5% Strain | | |
| MEK | 3.4 | 28.9 |
| Isopropanol | 0.0 | 2.1 |
| 1.0% Strain | | |
| MEK | 4.3 | 84.6 |
| Isopropanol | 0.0 | 3.2 |
| *Flexural Strength, psi* | | |
| 0.0% Strain | | |
| Control | 15,419 | 13,518 |
| MEK | 15,664 | 12,925 |
| Isopropanol | 14,613 | 13,072 |
| 0.5% Strain | | |
| Control | 15,915 | 13,179 |
| MEK | 536 | 3,808 |
| Isopropanol | 0 | 410 |

The results set forth in Table II demonstrate that the blend composition according to the present invention exhibits good transparency, improved Izod notched impact strength and improved environmental stress crack resistance as compared with the unmodified polyamide.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A graft copolymer comprising a rubber substrate and a grafted portion, the rubber substrate being formed from a least one monomer of Formula I

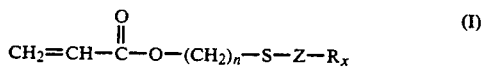

wherein Z is an aromatic group, each R is individually selected from the group consisting of alkyl groups of from 1 to about 12 carbon atoms, thioalkyl groups of from 1 to about 12 carbon atoms, and halogen atoms, n is from 1 to about 6, and x if from 0 to 7, and optionally at least one monomer selected from the group consisting of butadiene and $C_3$-$C_8$ alkyl acrylates, and the grafted portion being formed from at least one monomer selected from the group consisting of styrene, halogen-substituted styrene, alkyl-substituted styrene, and mixtures thereof.

2. A graft copolymer as defined by claim 1, wherein the rubber substrate comprises at least about 10 weight percent of units derived from the monomer of Formula I.

3. A graft copolymer as defined by claim 9, wherein the rubber substrate comprises from about 30 to about 70 weight percent of units derived from the monomer of Formula I.

4. A graft copolymer as defined by claim 3, wherein the rubber substrate comprises from about 30 to about 70 weight percent of units derived from the monomer selected from the group consisting of butadiene and $C_3$-$C_8$ alkyl acrylates.

5. A graft copolymer as defined by claim 1, wherein the rubber substrate is formed entirely from the monomer of formula I.

6. A graft copolymer as defined by claim 1, wherein the rubber substrate is formed with at least one of a divinyl or trivinyl crosslinking monomer and a graft site-providing allyl monomer, the crosslinking monomer and the graft site-providing monomer being used in a total amount of up to about 3 percent by weight of monomer from which the rubber substrate is formed.

7. A graft copolymer as defined by claim 1, wherein the rubber substrate has an average particle size of from about 0.05 to about 10 microns.

8. A graft copolymer as defined by claim 1, wherein the graft copolymer comprises at least about 5 weight percent of the rubber substrate.

9. A graft copolymer as defined by claim 8, wherein the graft copolymer comprises from about 50 to about 90 percent of the rubber substrate.

10. A graft copolymer as defined by claim 1, wherein the grafted portion is formed from 0.1 to about 15 weight percent of additional monomer selected from the group of monomers, consisting of maleic acid, itaconic acid, fumaric acid, acrylic acid, methacrylic acid, derivatives of said acids, acrylonitrile, methacrylonitrile, and mixtures thereof.

11. A graft copolymer as defined by claim 1, wherein the grafted portion is formed with at least one of a divinyl or trivinyl crosslinking monomer and a graft site-providing allyl monomer, the crosslinking monomer and the graft site-providing monomer being used in a total amount of up to about 3 percent by weight of monomer from which the grafted portion is formed.

12. A graft copolymer as defined by claim 1, wherein the rubber substrate has a glass transition temperature (Tg) of not greater then 0° C. and a refractive index of greater then 1.55, and the graft portion has a refractive index of greater than 1.55.

13. A graft copolymer as defined by claim 1, wherein the difference in the refractive indices of the rubber substrate and the graft portion is not greater than 0.025.

* * * * *